Patented May 19, 1925.

1,538,650

UNITED STATES PATENT OFFICE.

WILLIAM PEACOCK AND DANIEL GRAY, OF ONEIDA, NEW YORK, ASSIGNORS OF ONE-HALF TO CHESTER M. WOOLWORTH, OF PHILADELPHIA, PENNSYLVANIA.

SODA-LIME COMPOSITION OF MATTER USEFUL AS A GAS ABSORBENT.

No Drawing. Application filed January 6, 1923. Serial No. 611,157.

*To all whom it may concern:*

Be it known that we, WILLIAM PEACOCK and DANIEL GRAY, both citizens of the United States, residing at Oneida, in the county of Madison and State of New York, have invented certain new and useful Improvements in Soda-Lime Composition of Matter Useful as a Gas Absorbent; and we do hereby declare the following to be a full, clear, and exact description of the invention, such as will enable others skilled in the art to which it appertains to make and use the same.

This invention relates to a soda lime composition of matter especially adapted to prevent the tarnishing of silver and other ware in show cases, and has for its object to provide a mixture of ingredients which will be more efficient in action and less costly to produce than those heretofore proposed.

With these and other objects in view, the invention consists in the novel mixture of chemical compounds constituting an article of manufacture, all as will be more fully hereinafter disclosed and particularly pointed out in the claims.

In order that the precise invention may be the more clearly understood, it is said: It is well known that silver and other ware which is kept in show cases and windows by jewelers, and on hand by housekeepers, and other persons, commonly becomes tarnished through the action of hydrogen sulphide and other tarnishing compounds such as $SO_2$, commonly found in the atmosphere; and that in the case of jewelers, it is a matter of considerable importance and expense to keep such ware clean and bright, due to the tarnishing action of the atmosphere, and especially is this true in manufacturing and smelting communities.

It of course has been proposed heretofore to provide various means of combating these objections, but one of the main objections that has been encountered seems to depend on the fact that those devices which have been heretofore employed, in so far as we are aware, have failed to destroy the tarnishing agents such as the hydrogen sulphide present in the air. It would seem that the prior means have only absorbed these tarnishing agents, leaving them free to later evaporate or escape into the atmosphere and thus be available for doing additional damage, or when compounds have been formed from the hydrogen sulphide, they have been of such a character that would dissolve in water and be acted upon by acids in the atmosphere, so that $H_2S$ could be again formed and be free to tarnish the silver ware present.

In carrying out this invention, on the other hand, we provide a mixture not only containing substances having alkaline reactions which readily react with those acid constituents of the air which are liable to have a tarnishing action on silver ware, but we further provide a metal sulphide, so that as fast as any hydrogen sulphide constituent of the air reaches the same, it is converted into a sulphide that is insoluble, and therefore it can not be later liberated to exert its tarnishing action.

Stated in other words, in carrying out our invention we provide any suitable metal container such for example as one made of aluminum bronze, and in this container we place a mixture of sodium hydrate, NaOH, calcium oxide, CaO, and a base metal sulphate. By a base metal sulphate is meant copper sulphate, zinc sulphate, iron sulphate, or lead sulphate only. If copper sulphate is used, the particular aluminum bronze selected is preferably one consisting of about 5% aluminum, and 95% of copper, although other proportions of aluminum and copper may be selected if desired.

The above chemical compounds are preferably employed in their anhydrous condition, and they may be used in substantially equal proportions by weight, or in any other desired or suitable proportions, according to the particular region, or atmosphere, they are to be employed in. That is, in those regions where a very great deal of hydrogen sulphide is present in the air, we prefer to employ more of the metal sulphate than of the other ingredients, while in those places where a preponderance of sulphurous acid $SO_2$ is present in the air, we prefer to employ more of the sodium hydrate in our mixture.

These said ingredients are preferably ground up into rather coarse particles, of say about ⅛ of an inch in diameter, or somewhat smaller, and are placed in the aluminum bronze container or other metal container which is perforated or otherwise left open to the atmosphere of the show case or other enclosure in which the silver or other ware is to be kept.

The operation of the invention will be readily understood from the foregoing, but it may be said that in the presence of such a mixture, should there be any tarnishing agent, such as H₂S present, inside the show case, the said H₂S would readily unite with the metal sulphate present after the sodium hydroxide has been used up to form sulphuric acid and a metal sulphide which latter would be insoluble in the moisture of the air, and therefore said H₂S would be permanently taken out of said atmosphere, and could not later be reformed by acids present or evaporated to again reach the silver and tarnish the same all as will be clear from the following equation—

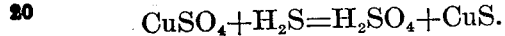

$$CuSO_4 + H_2S = H_2SO_4 + CuS.$$

In the same way, while there is sodium hydroxide present some of the hydrogen sulphide in the presence of moisture unites with the sodium present to form sodium sulphide and the calcium present to form calcium sulphide. In the latter case, an insoluble solid is formed which also permanently removes the hydrogen sulphide from the atmosphere of the show case, and thus again the tarnishing of the silver ware is prevented.

What is claimed is:

1. The herein described new composition of matter comprising a mixture of sodium hydroxide, calcium oxide, and a base metal sulphate, the same adapted to absorb hydrogen sulphide from the air and to convert the same into a metal sulphide.

2. The herein described new composition of matter comprising a mixture of sodium hydroxide, calcium oxide and copper sulphate, the same adapted to absorb hydrogen sulphide from the air and to convert said sulphate into copper sulphide.

In testimony whereof we affix our signatures.

WILLIAM PEACOCK.
DANIEL GRAY.